United States Patent [19]

Tanaka et al.

[11] 4,368,305

[45] Jan. 11, 1983

[54] PROCESS FOR PRODUCING OLEFIN POLYMERS

[75] Inventors: Toru Tanaka, Komae; Eiji Tanaka, Kawasaki, both of Japan

[73] Assignee: Mitsubishi Chemical Industries, Ltd., Tokyo, Japan

[21] Appl. No.: 213,998

[22] PCT Filed: Jan. 17, 1980

[86] PCT No.: PCT/JP80/00006

§ 371 Date: Aug. 1, 1980

§ 102(e) Date: Aug. 1, 1980

[87] PCT Pub. No.: WO80/01485

PCT Pub. Date: Jul. 24, 1980

[30] Foreign Application Priority Data

Jan. 18, 1979 [JP] Japan .................................. 54-4307
Feb. 2, 1979 [JP] Japan .................................. 54-11287

[51] Int. Cl.³ .......................... C08F 4/64; C08F 10/02
[52] U.S. Cl. .................................. 526/116; 252/429 B; 252/429 C; 252/431 R; 526/114; 526/127; 526/158; 526/348.6; 526/352
[58] Field of Search .............................. 526/116, 114

[56] References Cited

U.S. PATENT DOCUMENTS

| | | | |
|---|---|---|---|
| 3,173,901 | 3/1965 | Newberg et al. | 526/116 |
| 3,308,112 | 3/1967 | Ludlum | 526/116 |
| 3,678,025 | 7/1972 | Binell | 526/116 |
| 3,723,350 | 3/1973 | Schmitt et al. | 526/116 |
| 3,766,158 | 10/1973 | Yamaguchi et al. | 526/116 |
| 3,859,267 | 1/1975 | Yamaguchi et al. | 526/116 |
| 3,888,834 | 6/1975 | Yamaguchi et al. | 526/116 |
| 4,154,701 | 5/1979 | Melquist | 526/116 |

FOREIGN PATENT DOCUMENTS

| | | | |
|---|---|---|---|
| 2655394 | 6/1978 | Fed. Rep. of Germany | 526/116 |
| 53-44186 | 11/1978 | Japan | 526/116 |
| 1188336 | 4/1970 | United Kingdom | 526/116 |

*Primary Examiner*—Edward J. Smith
*Attorney, Agent, or Firm*—Oblon, Fisher, Spivak, McClelland & Maier

[57] ABSTRACT

A process for producing polyolefins and particularly polyethylene which are high in molecular weight or which are wide in molecular weight distribution and thus suitable for extrusion or blow molding purposes, the process comprising polymerizing olefins such as ethylene by the use of a catalytic system which is comprised of a solid catalytic component obtained by mixing or interacting oxygen-containing organometal compounds or halides of (a) vanadium and (b) hafnium or a solid catalytic component obtained by mixing or interacting oxygen-containing organometal compounds or halides of (A) vanadium, (B) hafnium and (C) titanium, and (D) an organoaluminum compound, and of an organoaluminum compound.

9 Claims, No Drawings

PROCESS FOR PRODUCING OLEFIN POLYMERS

BACKGROUND OF THE INVENTION

1. Field of the Invention

This invention relates to a process for producing olefin polymers. More particularly, it relates to a process for producing olefin polymers by use of a novel catalyst containing either a combination of a vanadium compound and a hafnium compound or a combination of a titanium compound, a vanadium compound and a hafnium compound.

2. Description of the Prior Art

Heretofore it is well known to polymerize α-olefins such as ethylene by the use of so-called Ziegler catalysts composed of transition metal compounds and organoaluminum compounds. For instance, in Japanese Patent Publication No. 49-11269, there has been proposed a catalytic system which comprises an eutectic crystal material obtained by reducing a mixture or reaction product of a titanium tetrahalide and a vanadium oxyalkoxide with an organoaluminum compound, and an organoaluminum compound. This catalyst system has very great advantages in production of polymer that it exhibits very high catalytic activity and that polymers obtained by the use of the catalytic system are narrow in distribution of particle size and high in bulk density.

The polymer obtained by the use of such catalytic system is narrow in molecular weight distribution and has been thus found suitable for application to injection molding, but has been found unsuitable for applications which requires relatively wide distribution of molecular weight such as in extrusion or blow molding.

In order to prepare polymers having a wide molecular weight distribution by using such catalyst which exhibits high activity for polymerization but serves to produce a polymer with a narrow molecular weight distribution, there have been proposed multi-stage polymerization methods or methods of blending polymers of different molecular weight. However, any of these methods require large-sized and complicate apparatus or need high technics of controlling a molecular weight ratio and a blending ratio of polymers to be blended.

Further, it is also known to use two or more catalytic components in combination so as to produce polymers with a wide molecular weight distribution. As an example of such combined catalyst there can be mentioned a catalyst using, in combination, catalytic components such as $TiOCl_2$, $ZrCl_4$ and the like compounds capable of producing relatively high molecular weight polymers and ordinarily employed catalytic components of capable of producing relatively low molecular weight polymers. We have already proposed in our Japanese Patent Application No. 53-64740 use of a combined catalyst of titanium, vanadium and zirconium compounds for a process of producing polymers with a wide molecular weight distribution. This process itself is useful but such catalyst is not satisfactory in its polymerization activity as applied for producing polymers with a very wide molecular weight distribution. In order to overcome the above disadvantage, a catalytic component serving to produce a relatively low molecular weight polymer and a catalytic component serving to produce a high molecular weight polymer should both exhibit high catalytic activities when employed to polymerize an olefin under the same conditions. Particularly, a catalyst serving to produce high molecular weight polymer which has been hitherto found to show low activity should be rendered highly active.

We have made an intensive study of such catalysts and, as a result, found that a solid catalyst containing hafnium, vanadium and a halogen exhibits high catalytic activity and ensures high molecular weight polymers. It has been already known to use a hafnium halide for polymerizing α-olefins, particularly ethylene, but such halide is usually very low in polymerization activity and is not usable in a commercial scale of polymer production. It is really surprising that use of a hafnium compound and a vanadium compound in combination results in a drastic increase of polymerization activity and ensures formation of high molecular weight polymers.

Further, we have found a process in which a combination of the vanadium-hafnium-base catalyst and a titanium-base catalyst is used to produce polymers with a very wide molecular weight distribution while ensuring high polymerization activity. This process has an advantage that the molecular weight distribution of polymer obtained by the use of the catalytic system can be readily controlled by changing ratios of the titanium compound, vanadium compound and hafnium compound contained in the catalyst.

SUMMARY OF THE INVENTION

The present invention contemplates to provide a process for producing olefin polymers characterized by polymerizing an olefin by the use of a catalyst which is comprised of a solid catalytic component obtained by mixing or interacting (a) a vanadium compound selected from vanadium halides and oxygen-containing organovanadium compounds and (b) a hafnium compound selected from the group consisting of hafnium halides and oxygen-containing organohafnium compounds or by interacting (A) a vanadium compound selected from vanadium halides and oxygen-containing organovanadium compounds, (B) a hafnium compound selected from hafnium halides and oxygen-containing organohafnium compounds, (C) a titanium compound selected from titanium halides and oxygen-containing organotitanium compounds, and (D) an organoaluminum compound, and of an organoaluminum compound.

The present invention will be described in more detail.

The titanium, vanadium and hafnium compounds to be used for preparing the solid catalytic component according to the invention are taken from oxygen-containing organometal compounds and halides of the respective metals. The oxygen-containing organometal compound used herein is intended to mean a compound having at least one metal-oxygen-organic group bonding in this order in one molecule thereof. The organometal compound may be a condensation compound having a metal-oxygen-metal bonding provided that it has at least one metal-oxygen-organic group bonding in one molecule thereof. Any of organic groups may be used for this purpose. In general, there are used organic groups having 1–20 carbon atoms and preferably hydrocarbon groups such as, for example, an alkyl group, a cycloalkyl group, an aryl group, an alkylaryl group, an arylalkyl group and the like. The metal halide means at least one metal-halogen bonding in one molecule thereof and may be a condensation compound having a metal-oxygen-metal bonding provided that it has at least one metal-halogen bonding in one molecule thereof. The halogen atom includes fluorine, chlorine, bromine and iodine. Of these, bromine or chlorine is preferably used. Most preferable oxygen-containing organometal compounds and halides are those represented by the general formula $$[MeO_a(OR)_bX_c]_d$$

(in which R and X represent the above-described organic group and the above-described halogen atom respectively, and Me represents titanium, vanadium or hafnium, a is a value of $0 \leq a \leq 1$, b is a value of $0 \leq b \leq 5$, c is a value of $0 \leq c \leq 5$, $a \times 2 + b + c$ is equal to a valence of the metal used, and d is an integer of $1 \leq d \leq 6$).

Preferable vanadium compounds are tetravalent or pentavalent vanadium compounds represented by the general formula $$[VO_{a1}(OR^1)_{b1}X^1_{c1}]_{d1}$$

(in which $a^1$, $b^1$ and $c^1$ are values of $0 \leq a^1 \leq 1$, $0 \leq b^1 \leq 5$, and $0 \leq c^1 \leq 5$, respectively, $a^1 \times 2 + b^1 + c^1$ is a value equal to the valence of vanadium, $d^1$ is an integer of $1 \leq d^1 \leq 6$, $R^1$ represents a hydrocarbon group containing 1-20 carbon atoms, preferable 1-12 carbon atoms and includes, for example, an alkyl group, a cycloalkyl group, an aryl group, an alkylaryl group or an arylalkyl group, and $X^1$ represents a halogen atom). Of these, pentavalent vanadium compounds represented by the general formula $VO(OR^2)_{a2}X^2_{3-a2}$ (in which $a^2$ is a value of $0 \leq a^2 \leq 3$, and $R^2$ and $X^2$ have the same meanings as $R^1$ and $X^1$, respectively) and tetravalent vanadium compounds represented by the general formula $$V(OR^2)_{b2}X^2_{4-b2}$$

(in which $b^2$ is a value of $0 \leq b^2 \leq 4$, and $R^2$ and $X^2$ have the same meanings as defined above) are most preferably used. In this case, chlorine and bromine are preferable as the halogen atom. Specific examples of these compounds are oxyalkoxides such as, for example, $VO(O\text{-}n\text{-}C_4H_9)_3$, and $VO(OC_2H_5)_3$, oxyhalides such as $VOCl_3$ and $VOBr_3$, oxyphenoxides such as $VO(OC_6H_5)_3$, oxyalkoxyhalides such as $VO(OC_2H_5)_2Br$, $VO(O\text{-}n\text{-}C_4H_9)_2Br$, $VO(OC_2H_5)_2Cl$, $VO(O\text{-}n\text{-}C_4H_9)_2Cl$, and $VO(O\text{-}n\text{-}C_4H_9)Br_2$, tetrahalides such as $VBr_4$, $VCl_4$ and the like. Besides, complexes with various Lewis bases such as $VBr_4.2(butyl\ ether)$ may be used. The compounds may have different organic groups or halogen atoms and the vanadium compounds may be used singly or in combination.

Preferable hafnium compounds are tetravalent hafnium compounds represented by the general formula, $[Hf.O_{a3}(OR^3)_{b3}X^3_{c3}]_{d3}$, (in which a3, b3, and c3 are values of $0 \leq a3 \leq 1$, $0 \leq b3 \leq 4$, and $0 \leq c3 \leq 4$, respectively, provided that $a3 \times 2 + b3 + c3 = 4$, d3 is an integer of $1 \leq d3 \leq 6$, and $R^3$ and $X^3$ have the same meanings as $R^1$ and $X^1$). Most preferably, tetravalent hafnium compounds represented by the general formula $$Hf(OR^3)_{a4}X^3_{4-a4}$$

(in which $a^4$ is a value of $0 \leq a^4 \leq 4$, and $R^3$ and $X^3$ have the same meanings as $R^1$ and $X^1$). As the halogen atom, chlorine or bromine is preferably used. Examples of these compounds include alkoxides such as $Hf(O\text{-}n\text{-}C_4H_9)_4$ and $Hf(OC_2H_5)_4$, phenoxides such as $Hf(OC_6H_5)_4$, alkoxyhalides such as $Hf(O\text{-}n\text{-}C_4H_9)_3Cl$ and $Hf(O\text{-}n\text{-}C_4H_9)_2Br_2$, tetrahalides such as $HfCl_4$ and $HfBr_4$, oxyhalides such as $HfOCl_2$ (which compound is ordinarily employed in the form of $HfOCl_2.8H_2O$), and the like. Complexes with various Lewis bases such as $HfBr_4.2(ethyl\ acetate)$ may be likewise used. The compounds may have different organic groups or halogen atoms in one molecule thereof and the hafnium compounds may be used singly or in combination.

In preparing a solid catalytic component by mixing or reacting the vanadium compound with the hafnium compound, both compounds are brought to contact with each other in the presence or absence of a diluent. The contacting temperature is not critical but is, for example, selected from a range of 0° C.–200° C. and is generally near a normal temperature. The pressure is also not critical and is generally near a normal pressure. After the contact, both compounds are mixed and may be reacted with each other simultaneously or subsequently with contact. When contacting, at least one of the compounds preferably is liquid. To this end, at least one of the compounds should preferably be a compound which has one or more of organic oxygen-containing groups, i.e. $OR^1$, $OR^2$ or $OR^3$. If the both compounds are solid, it is recommended to use a diluent which is able to dissolve at least one compound. The resulting mixture or reaction product may be used as it is as a solid catalytic component or the solid matter may be separated from the reaction product for use as a solid catalytic component. When a diluent is used to give the mixture or reaction product in the form of a liquid, the diluent is removed to precipitate a solid matter and the solid matter is separated to give a solid catalytic component. Alternatively, the both compounds are mixed or reacted in a polymerization system to form a solid catalytic component, which is used in combination with an organoaluminum compound simultaneously with the formation of such solid catalytic component so as to serve as a catalyst for polymerization of olefins. As the diluent there are usable all the ordinary inactive hydrocarbon solvents. Preferably, alkanes, cycloalkanes and aromatic hydrocarbons having 6–20 carbon atoms are used. Examples of these compounds include hexane, heptane, cyclohexane, benzene, toluene, xylene and the like. Alternatively, polar solvents may likewise used and include, for example, halogenated hydrocarbons such as ethylene dichloride, chlorobenzene and the like, alcohols having 1–8 carbon atoms, carboxylic esters, ethers, pyridines and the like.

A solid catalytic component which is obtained by interacting three components of a vanadium compound and a hafnium compound to which a halogenating agent is added is preferable since it ensures high activity and formation of polymers of high molecular weight when applied as a catalyst.

The halogenating agents useful for the above purpose include halogens such as chlorine, bromine and the like, halogen-containing aluminum compounds such as aluminum chloride, aluminum bromide, methylaluminum dichloride, ethylaluminum dichloride, butylaluminum dichloride, methylaluminum sesquichloride, ethylaluminum sesquichloride, diethylaluminum monochloride and the like, silicon tetrachloride, tin tetrachloride and the like. Of these, the halogen-containing aluminum compounds and particularly compounds represented by the general formula, $AlR^4_nX^4_{3-n}$, (in which $R^4$ represents a hydrocarbon group containing 1–12 carbon atoms, $X^4$ represents a halogen atom, and n is a value of $0 \leq n < 3$) are particularly preferably. Examples of $R^4$ and $X^4$ are those as exemplified with reference to $R^1$ and $X^1$, respectively, and n is a value of 0, 1, 1.5 and 2.

The three components of the vanadium compound, hafnium compound and halogenating agent are preferably interacted in a manner as follows: First, a vanadium compound and a hafnium compound are mixed or reacted with each other in the presence or absence of a diluent to prepare a liquid matter and then a halogenating agent is subjected to reaction with the liquid matter, and the resulting solid catalytic component is separated from the reaction mixture. The mixing or reaction of the vanadium compound and the hafnium compound is carried out in a manner as described hereinbefore, in which a diluent is added, if necessary, so as to make the mixture or reaction product liquid. Then, the resulting liquid product is incorporated with a halogenating agent for subsequent reaction. The reaction is preferably conducted in an inert solvent even though the mixture or reaction product obtained as mentioned hereinabove is in the form of a liquid in the absence of a diluent. As the inert solvent there are usually employed inert hydrocarbon solvents as indicated as the diluent. If a polar solvent is employed on mixing or reaction of the vanadium compound and hafnium compound, it may be removed by distillation under reduced pressure or other suitable methods prior to reaction with a halogenating agent or may be reacted with the halogenating agent without being removed.

The reaction with a halogenating agent is effected as follows: A halogenating agent is added to the mixture or reaction product of the vanadium compound and hafnium compound to which an inert solvent is added, followed by reaction at a temperature ranging preferably a normal temperature—200° C. and most preferably 50° C.–150° C. The resulting solid which is insoluble in the inert solvent is separated from the reaction system and washed with an inert solvent.

Another method of interacting the three components is a method in which three components are mixed or reacted simultaneously in an inert solvent. In the case, the same reaction conditions mentioned above can be used.

The amounts of the respective components are not critical but an atomic ratio of vanadium in vanadium compound to hafnium in hafnium compound (V/Hf) is generally in the range of $1/100 \leq V/Hf \leq 100$, preferably $1/10 \leq V/Hf \leq 10$.

When a halogenating agent is employed, its amount as expressed by an atomic ratio of halogen contained in the halogenating agent to vanadium and hafnium in the vanadium and hafnium compounds X/(V+Hf), is generally in the range of $0.1 \leq X/(V+Hf) \leq 100$, preferably $1 \leq X/(V+Hf) \leq 50$.

In order to obtain a vanadium-hafnium-titanium catalyst by combining a titanium-base catalyst with the above-discussed vanadium-hafnium-base catalyst, a vanadium compound, hafnium compound, titanium compound and organoaluminum compound are interacted to prepare a solid catalytic component.

The titanium compounds are preferred to be tetravalent titanium compounds represented by the general formula $$[TiO_{a5}(OR^5)_{b5}X^5_{c5}]_{d5}$$

(in which $a^5$, $b^5$ and $c^5$ are values of $0 \leq a^5 \leq 1$, $0 \leq b^5 \leq 4$ and $0 \leq c^5 \leq 4$, respectively, provided that $a^5 \times 2 + b^5 + c^5 = 4$, $d^5$ is an integer of $1 \leq d^5 \leq 6$, and $R^5$ and $X^5$ have the same meanings as $R^1$ and $X^1$, respectively) among which tetravalent titanium compounds represented by the general formula $$Ti(OR^6)_{a6}X^6_{4-a6}$$

(in which $a^6$ is a value of $0 \leq a^6 \leq 4$, and $R^6$ and $X^6$ have the same meanings as $R^1$ and $X^1$, respectively). A most preferably halogen atom is bromine. Examples of the titanium compound include alkoxides such as Ti(OC$_2$H$_5$)$_4$ and Ti(O-n-C$_4$H$_9$)$_4$, phenoxides such as Ti(OC$_6$H$_5$)$_4$, oxyalkoxides such as TiO(OC$_2$H$_5$)$_2$, tetrahalides such as TiCl$_4$ and TiBr$_4$, oxyhalides such as TiOCl$_2$ and TiOBr$_2$, and halogenated alkoxides such as Ti(OC$_2$H$_5$)$_2$Cl$_2$, Ti(OC$_2$H$_5$)$_2$Br$_2$, Ti(O-n-C$_4$H$_9$)$_3$Br, Ti(O-n-C$_4$H$_9$)$_3$Cl and the like. Complexes of these compounds with various Lewis bases such as TiBr$_4$.2(butyl ether), TiBr$_3$(O-n-C$_4$H$_9$).ethyl acetate and the like may be used. Compounds having different organic groups or halogen atoms may be likewise used and the titanium compounds may be used singly or in combination.

Further, condensates of tetravalent titanium alcoholate having at least one TiO-Ti bonding and represented by the general formula $$[TiO_{q1}(OR^{12})_{q2}]_{q3}$$

(in which $q_1$ and $q^2$ are values of $0.5 \leq q^1 \leq 1$ and $2 < q^2 \leq 3$, respectively, provided that $q^1 \times 2 + q^2 = 4$, $q^3$ is an integer of $2 \leq q^3 \leq 6$, and $R^{12}$ has the same meaning as $R^1$) are favorable due to a fact that they can provide a catalyst serving to form olefin polymers which show good extrusion moldability and high bulk density and have small contents of large-sized particles and fine particles. Examples of these compounds are oligomers derived from titanium tetraalkoxides, e.g. condensed dimers-hexamers such as of titanium tetramethoxide, titanium tetraethoxide, titanium tetrapropoxide, titanium tetrabutoxide and the like. As a matter of course, these condensates may be used in combination or condensates of mixed alkoxides may be likewise used.

On the other hand, preferable organic aluminum compounds are those expressed by the general formula, AlR$_l^7$X$_{3-l}^7$ (in which $R^7$ represents a hydrocarbon group containing 1-20, preferably 1-6 carbon atoms, $X^7$ represents a halogen atom, and l is a value of $0 < l \leq 3$).

Preferably, $R^7$ is selected from an alkyl group, a cycloalkyl group, an aryl group, an arylalkyl group and an alkylaryl group. As $X^7$ there is mentioned chlorine, bromine, iodine or the like. Specific examples of these compounds include Al(C$_2$H$_5$)$_3$, Al(C$_2$H$_5$)$_2$Cl, Al$_2$(C$_2$H$_5$)$_3$Cl$_3$, Al(C$_2$H$_5$)$_2$Cl, Al(C$_2$H$_5$)$_2$Br and the like. Most preferable organoaluminum compounds are organoaluminum bromides. Where a solid catalytic component prepared using an organoaluminum bromide is used and the polymerizations conducted while permitting hydrogen to be present in a polymerization reaction zone, there is an advantage that the control of molecular weight by hydrogen is very effectively feasible. Preferable organoaluminum bromide compounds are those represented by the general formula $$AlR_m^8Br_{3-m}$$

(in which $R^8$ represents a hydrocarbon group containing 1-20, preferably 1-6, carbon atoms, and m is a value of $0 < m < 3$). $R^8$ preferably represents a member selected from an alkyl group, a cycloalkyl group, an aryl group, an arylalkyl group and an alkylaryl group. Specific examples of these compounds include $Al(CH_3)Br_2$, $Al(C_2H_5)Br_2$, $Al(i-C_4H_9)Br_2$, $Al(n-C_8H_{17})Br_2$, $Al(C_2H_5)_2Br$, $Al(C_2H_5)_2Br$, $(CH_3)_{1.5}AlBr_{1.5}$, $(C_2H_5)_{1.5}AlBr_{1.5}$ and the like. Of these, organoaluminum dibromides which are represented by the above general formula where m is 1 and include $Al(C_2H_5)Br_2$, $Al(CH_3)Br_2$ and the like are preferably used. These organoaluminum compounds may be used singly or in combination, or organoaluminum compounds having different organic groups or halogen atoms in one molecule thereof may be likewise used. Aluminum trihalides and organoaluminum compounds may be used in combination. Use of a mixture of an organoaluminum dibromide and an organoaluminum dichloride ensures formation of a catalyst with a noticeable characteristic. That is, a polymer having an extremely wide molecular weight distribution will cause an unstable flow of its melt on melt molding and often produce an irregular pattern on the surface of the resulting molding irrespectively of its high extrudability. However, olefin polymers obtained by the use of a catalyst prepared from the above-mentioned mixture, though showing a fairly wide molecular weight distribution and having high extrudability, are free of the unstable flow of melt and the irregular pattern appearing on the molding surface. The organoaluminum dichloride compounds are those represented by the afore-indicated general formula $AlR_l^7X_{3-l}^7$ where l is 1 and X is chloride. The mixing ratio of the both compounds are in the range of 1/10–10, preferably 1/5–5 based on an atomic ratio of Br/Cl.

The respective components are admixed in an arbitrary order and reacted. For instance, a titanium compound, vanadium compound and hafnium compound are mixed, to which an organoaluminum compound is added for reaction. In more detail, a titanium compound, vanadium compound and hafnium compound are first admixed. These compounds are added in an arbitrary order. After the mixing, an interaction between the compounds may be brought about. The temperature at which the components are added is not critical and is in the range of 0° C.–200° C. and usually a normal temperature is used. The pressure is also not critical and is generally a normal pressure. The mixing is feasible either in the presence or absence of a diluent but a mixture should preferably be in the form of a liquid (or may be in the form of a slurry). Accordingly, when compounds themselves are not liquid under mixing conditions or an amount of a liquid compound is insufficient, a diluent is preferably added. As the diluent all the ordinary inert hydrocarbon solvents are usable and alkanes, cycloalkanes and aromatic hydrocarbons having 6–20 carbon atoms are preferably used. Examples of such compound include hexane, heptane, cyclohexane, benzene, toluene, xylene and the like. Polar solvents may be likewise used. Such solvents include, for example, ethylene dichloride, alcohols having 1–8 carbon atoms, carboxylic esters, ethers, pyridine and the like. Titanium, vanadium and hafnium compounds may be added as solutions in the above-indicated polar solvent or inert hydrocarbon solvent.

Then, the mixture or reaction product of the titanium, vanadium and hafnium compounds thus obtained is reacted with an organoaluminum compound to prepare a solid catalytic component. Even though the mixture or reaction product is in a completely liquid state without use of any diluent, the reaction with an organoaluminum compound should preferably be conducted in an inert solvent. As the inert solvent, there are usually employed inert hydrocarbon solvents which have been indicated as one example of the diluents. If a polar solvent has been used on the mixing, the solvent may be removed by distillation under reduced pressure or by other methods prior to the reaction with an organoaluminum compound, or may not be removed to allow the mixture to reaction with an organoaluminum compound as it is.

The reaction with an organoaluminum compound is conducted as follows: The organoaluminum compound is added to the mixture of titanium, vanadium and hafnium compounds to which an inert solvent has been added, followed by reaction at temperatures of preferably a normal temperature—200° C. and most preferably 50° C.–150° C. As a result, there is obtained a solid insoluble in the inert solvent. It is preferable that the solid is separated and washed with an inert solvent, but the reaction mixture may be used as it is without separation.

Another method comprises admixing a vanadium compound with a hafnium compound, adding an organoaluminum compound to the mixture in an inert solvent, further adding a titanium compound for further reaction after the reaction of the compound with the mixture or just after the addition of the compound, and preferably separating the resulting solid from the reaction mixture. The reaction conditions are those as indicated in the foregoing method.

The amounts of the respective compounds are selected such that a ratio of a sum total t by gram equivalent of the respective metals in the titanium, vanadium and hafnium compounds to a sum total u by gram equivalent of the respective halogens in the titanium, vanadium, hafnium and organoaluminum compounds, u/t, is in the range of u/t > 0.6, preferably u/t > 1. The gram equivalent is defined such that gram equivalent = gram atom of element/valence of the element. The range of u/t > 0.6 is advantageous in that production of polymers with a wide distribution of molecular weight is made easily. The upper limit of the u/t value is not critical but its value is sufficient to be generally up to about 10. When an organoaluminum bromide is used, an amount of other halogen is preferred to be 10 or more as expressed by bromine/other halogen (molar ratio). As expressed by gram atom, the amounts of the respective metals of titanium, vanadium and hafnium should preferably be selected to satisfy the following inequalities:

$0.1 < Hf/Ti < 10$, $0.01 < (Hf+Ti)/V < 100$, and preferably $0.2 < Hf/Ti < 8$ and $0.05 < (Hf+Ti)/V < 10$.

With the Hf/Ti value within the range defined above, the resulting catalyst makes it easy to produce polymers with a wide molecular weight distribution. The above-defined range of the (Hf+Ti)/V value is advantageous in that the polymerization activity of the resulting catalyst becomes very high.

In preparing a solid catalytic component by interacting the vanadium, hafnium, titanium and organoaluminum compounds, part of the hafnium compound may be replaced by a zirconium compound. As the zirconium compound there are used halides and oxygen-containing organic compounds. Preferably, these zirconium compounds are tetravalent zirconium compounds represented by the general formula, $[ZrO_{a^9}(OR^9)_{b^9}X^9_{c^9}]_{d^9}$ (in which $a^9$, $b^9$, $c^9$ are, respectively, values of $0 \leq a^9 \leq 1$, $0 \leq b^9 \leq 4$ and $0 \leq c^9 \leq 4$ provided that $a^9 \times 2 + b^9 + c^9 = 4$, $d^9$ is an integer of $1 \leq d^9 \leq 6$, and $R^9$ and $X^9$ have the same meanings as $R^1$ and $X^1$, respectively). Most preferable zirconium compounds are represented by the general formula, $$Zr(OR^{10})_{a^{10}}X^{10}_{4-a^{10}}$$

(in which $a^{10}$ is a value of $0 \leq a^{10} \leq 4$, and $R^{10}$ and $X^{10}$ have the same meanings as $R^1$ and $X^1$, respectively). The halogen is preferred to be chlorine or bromine. Examples of these zirconium compounds are alkoxides such as, for example, $Zr(O\text{-}n\text{-}C_4H_9)_4$ and $Zr(OC_2H_5)_4$, phenoxides such as $Zr(OC_6H_5)_4$, alkoxyhalides such as $Zr(O\text{-}n\text{-}C_4H_9)_3Cl$, $Zr(O\text{-}n\text{-}C_4H_9)_3Br$ and $Zr(O\text{-}n\text{-}C_4H_9)_2Br_2$, tetrahalides such as $ZrCl_4$ and $ZrBr_4$, and oxyhalides such as $ZrOBr_2$ (which compound is usually employed in the form of $ZrOBr_2.8H_2O$). Complexes with various Lewis bases such as $ZrCl_4.2(\text{ethyl acetate})$ may be likewise used. The compounds having different organic groups or halogen atoms therein may be also used or the zirconium compounds may be used singly or in combination.

When a zirconium compound is used, the amounts of the respective compounds are, as expressed by ratios by gram atom of titanium, vanadium, zirconium and hafnium atoms, in the ranges of $0.2 < (Zr+Hf)/Ti < 8$ and $0.05 < (Ti+Zr+Hf)/V < 10$. The catalytic system having a $(Zr+Hf)/Ti$ value within the above-defined range makes it very easy to produce polymers which have wide molecular weight distribution and high extrudability and which do not cause any abnormal flow phenomenon on molding, while a catalytic system having a $(Ti+Zr+Hf)/V$ value within the above-defined range is advantageous in its very high polymerization activity.

In the practice of the invention, the amounts of these compounds including an organoaluminum compound should be selected to satisfy the following inequality, $3 \leq x/r \leq 6$, (in which r represents a sum total by mole of alkoxygroups in titanium, vanadium, zirconium, and hafnium compounds and x represents a sum total by gram atom of halogen atoms in titanium, vanadium, zirconium, hafnium and organoaluminum compounds). Less x/r ratio than 3 leads to a narrow molecular weight distribution and greater ratio than 6 results in lowering of catalytic activity. The ratio by gram atom of zirconium to hafnium is desired to be preferably in a range of $0.1 \leq Zr/Hf \leq 10$ and most preferably in a range of $0.2 \leq Zr/Hf \leq 4$.

As the organoaluminum compound used as a cocatalyst mentioned are compounds represented, for example, by the general formula $$AlR_k^{11}X^{11}_{3-k}$$

(in which $R^{11}$ represents an alkyl group, an aryl group or a cycloalkyl group, $X^{11}$ represents a halogen atom, and k is a number of 1-3). In particular, trialkylaluminum compounds such as triethylaluminum, tri-n-propylaluminum, triisobutylaluminum and the like are preferable.

The ratio of the organoaluminum compound to the hydrocarbonisoluble solid catalytic component is in the range of 0.1-100, preferably 0.2-20 as expressed by an atomic ratio of $Al/(V+Ti+Hf)$ or $Al/(V+Ti+Hf+Zr)$ when a zirconium compound is additionally used.

The thus prepared catalytic system is used to polymerize olefins. The olefins useful for the purpose of the invention are $\alpha$-olefins such as ethylene, propylene, butene-1, pentene-1, octene-1 and the like. Needless to say, these olefins may be mixed and copolymerized. The catalytic system is very conveniently used to produce ethylene homopolymer or ethylene copolymer containing up to 10 wt. %, preferably up to 5 wt. %, with other $\alpha$-olefin. The polymerization reaction may be conducted by any of methods including a solution polymerization or a slurry polymerization conducted in inert solvent, or a gas phase polymerization using no solvent. In general, the polymerization is conducted in inert solvent in which an olefin or olefin mixture is fed to while keeping the temperature and pressure at predetermined levels. The inert solvents used include aliphatic hydrocarbons such as pentane, hexane, heptane, octane, isooctane and the like, alicyclic hydrocarbons such as cyclopentane, cyclohexane and the like, and aromatic hydrocarbons such as benzene, toluene and the like. The polymerization reaction is generally carried out at temperatures of a normal temperature $-200°$ C. and under a pressure of a normal pressure to 100 atoms.

Presence of hydrogen in a polymerization reaction zone is very effective in controlling the molecular weight of polymer, ensuring a polymer with a desired molecular weight. The amount of hydrogen to be present in the zone depends on the polymerization conditions or the molecular weight of a required olefin polymer and should be controlled accordingly. As described hereinbefore, the molecular weight controlling effect by hydrogen is especially noticeable when a solid catalytic component prepared from titanium, vanadium, hafnium and organoaluminum bromide compounds is used. In this case, for example, in order to produce a polymer having a melt index of 0.3-0.05 at a polymerization temperature of 90° C., it is sufficient to add hydrogen in an amount of about 50-150 mole % of ethylene.

As will be understood from the foregoing, the process of the present invention has a number of advantages: The catalytic system is high in polymerization activity; the vanadium-hafnium-base catalyst ensures olefin polymers with high molecular weight; and with the vanadium-hafnium-titanium-base catalyst, a distribution of molecular weight of polymer can be readily controlled by varying ratios of titanium, vanadium, hafnium and organoaluminum compounds, making it possible to readily produce olefin polymers which have a wide molecular weight distribution and are excellent in moldability when subjected to extrusion or blow molding.

BEST MODE FOR CARRYING OUT THE INVENTION

The present invention will be described in detail by way of examples, which should not be construed as limiting the invention thereto.

In examples, the polymerization activity K of catalyst was expressed as follows: K=(g.polymer)/(g.catalyst)(hr.) (kg/cm² of pressure of olefin). The melt index was measured at 190° C. under a load of 2.16 kg based on the method prescribed in ASTM.D.1238.57T and expressed in terms of MI. The flow ratio (hereinlater abbreviated as FR) as a measure for molecular weight distribution is a value showing a shear stress dependency of a melt viscosity and was expressed by a ratio (MI $10^6$/MI $10^5$) of melt indexes measured at shear stresses of $10^6$ dyne/cm² and $10^5$ dyne/cm², respectively, on the basis of the method in ASTM.D.1238.57T. It is generally accepted that the greater the FR, the wider is a molecular weight distribution, and vice versa. The density ρ was measured according to the method prescribed in ASTM D-1505.

ample 1 without use of vanadium tetrachloride and ethylene was polymerized by the use of such catalytic component and, as a result, the polymerization activity K was found to be 19.

TABLE 1

| | Vanadium Compound | | Hafnium Compound | | Halogenating Agent | | Analytical value of solid catalyst | | | Polymerization Activity K | M I (g/10 min.) |
|---|---|---|---|---|---|---|---|---|---|---|---|
| Number | Kind | Amount (m mol) | Kind | Amount (m mol) | Kind | Amount (m mol) | V (wt. %) | Hf (wt. %) | Cl (wt. %) | | |
| Example 2 | VCl$_4$ | 15.1 | Hf(OnBu)$_4$ | 15.1 | SiCl$_4$ | 51 | 10.1 | 34.6 | 53.4 | 640 | 0.011 |
| Example 3 | VO(OnBu)$_3$ | 15.1 | HfCl$_4$ | 15.1 | (C$_2$H$_5$)$_2$AlCl | 290 | 9.55 | 34.1 | 48.1 | 990 | 0.002 |
| Example 4 | VO(OnBu)$_3$ | 15.1 | HfCl$_4$ | 15.1 | C$_2$H$_5$AlCl$_2$ | 145 | 9.45 | 35.4 | 46.8 | 1,210 | 0.0015 |
| Example 5 | VO(OnBu)$_3$ | 7.5 | HfCl$_4$ | 22.5 | C$_2$H$_5$AlCl$_2$ | 145 | 4.26 | 50.3 | 40.2 | 790 | 0.001 |
| Example 6 | VO(OnBu)$_3$ | 25.1 | HfCl$_4$ | 5.3 | C$_2$H$_5$AlCl$_2$ | 145 | 17.0 | 11.7 | 49.3 | 950 | 0.002 |
| Example 7 | VO(OnBu)$_3$ | 15.1 | HfCl$_2$(OnBu)$_2$ | 15.1 | C$_2$H$_5$AlCl$_2$ | 95 | 10.4 | 33.5 | 45.1 | 1,310 | 0.0015 |
| Example 8 | VO(OnBu)$_3$ | 15.1 | HfCl$_2$(OnBu)$_2$ C$_4$H$_9$OH | 15.1 | C$_2$H$_5$AlCl$_2$ | 145 | 9.65 | 34.9 | 47.5 | 1,220 | 0.0015 |
| Example 9 | VO(OnBu)$_2$Cl | 15.1 | Hf(OnBu)$_4$ | 15.1 | C$_2$H$_5$AlCl$_2$ | 210 | 9.71 | 36.3 | 44.9 | 1,010 | 0.0009 |
| Example 10 | VCl$_4$ | 15.1 | Hf(OnBu)$_2$Cl$_2$ | 15.1 | AlCl$_3$ | 91 | 10.1 | 33.0 | 53.0 | 730 | 0.003 |

EXAMPLE 1

Three grams of vanadium tetrachloride and 7.3 g of tetra-n-butoxyhafnium were dissolved in 500 ml of hexane. After heating to 60° C., the solution was incorporated with 22.8 g of a 50 wt. % Al(C$_2$H$_5$)Cl$_2$ solution in hexane, followed by reaction at the same temperature for 1 hour. The resulting precipitate was washed with hexane to obtain a solid catalytic component. The solid component was found to contain 10.0 wt. % of V, 34.9 wt. % of Hf, 45.9 wt. % of Cl and 0.5 wt. % of Al.

Then, 500 ml of n-hexane was placed in an 1 l autoclave, into which 20 mg of the solid catalytic component and 0.8 m mols of triisobutylaluminum were charged. The mixture was heated to 85° C. and then incorporated with hydrogen up to a pressure of 14 kg/cm$^2$. Thereafter, ethylene was fed for polymerization at a total pressure of 20 kg/cm$^2$ and, after one hour of the feed, ethanol was charged under pressure to stop the polymerization. As a result, 121 g of polyethylene was obtained and its polymerization activity K was 1010 and MI was 0.0015 g/10 min.

EXAMPLE 2-10

Predetermined amounts of vanadium compounds and hafnium compounds indicated in Table 1 were dissolved in 500 ml of benzene, followed by adding at 60° C. benzene solutions of 50 wt. % of various halogenating agents indicated in Table 1 and agitation at 65° C. for 1 hour. The resulting precipitate was washed with hexane to obtain a solid catalytic component in each case. The analytical values of the respective catalytic components are shown in Table 1.

Then, 500 ml of hexane was placed in an 1 l autoclave and Example 1 was repeated for polymerizing ethylene except that each of the solid catalytic components obtained above was used. The results are shown in Table 1. In the table, nBu means a normal butyl group, n-C$_4$H$_9$, which is applied whenever it appears hereinlater.

COMPARATIVE EXAMPLE 1

Example 1 was repeated except that hafnium tetrachloride was used instead of the solid catalytic component for polymerizing ethylene. The polymerization activity K was found to be 32.

COMPARATIVE EXAMPLE 2

Example 1 was repeated except that a solid catalytic component was obtained in the same manner as in Example 1 without use of vanadium tetrachloride and ethylene was polymerized by the use of such catalytic component and, as a result, the polymerization activity K was found to be 19.

EXAMPLE 11

500 ml of n-hexane was placed in an 1 l autoclave and heated to 85° C. Then, hydrogen was introduced in the autoclave up to 14 kg/cm$^2$. Thereafter, 14.0 mg of tri-normal-butoxy-vanadyl, 15.6 mg of hafnium tetrachloride and 0.8 m mols of triisobutylaluminum were added to prepare a catalyst slurry and simultaneously ethylene was fed to the autoclave to polymerize ethylene at a total pressure of 20 kg/cm$^2$. One hour after the feed, ethanol was charged under pressure to stop the polymerization. Polyethylene was obtained in an amount of 71 g and had K=400 and MI=0.025 g/10 min.

COMPARATIVE EXAMPLE 3

When Example 11 was repeated for polymerizing ethylene using no hafnium tetrachloride, no polymer was obtained.

EXAMPLE 12-16

(1) Preparation of Solid Catalytic Components

In a 300 ml four necked distillation flask were mixed titanium tetra-n-butoxide, vanadyl tri-n-butoxide, hafnium tetra-n-butoxide and benzene in amounts indicated in Table 2 to give a homogeneous solution. Then, a benzene solution of 4.0 mols/l of ethylaluminum dichloride was dropped into the solution at 60° C. in amounts indicated in Table 2, followed by agitation at 65° C. for 1 hour. The resulting precipitate was washed with n-hexane and dried to obtain a powder of catalyst.

(2) Polymerization of Ethylene 1,000 cc of n-hexane was place in 2 l autoclave, into which 20 mg of the above catalyst powder was charged. The system was heated to 85° C., into which hydrogen was introduced to a predetermined pressure indicated in Table 2, followed by introducing 0.8 m mols of triisobutylaluminum together with ethylene so as to make a total pressure 15 kg/cm$^2$. Simultaneously with the feed of ethylene, absorption of ethylene was observed and fresh ethylene was additionally fed so that a total pressure was held at 15 kg/cm$^2$. One hour after the feed, ethanol was charged into under pressure to stop the polymerization. The results are shown in Table 2.

EXAMPLES 17–20

Various titanium, vanadium and hafnium compounds were mixed in such ratios as indicated in Table 2.

In all the examples, generation of heat and change in color were observed to take place on the mixing and thus reactions took place between the compounds.

After the mixing, the mixture was agitated at 60° C. for 30 minutes, to which was then added benzene in amount indicated in Table 2, followed by dropping aluminum compounds indicated in Table 2 in the form of a benzene solution having a concentration of 4 mols/l at 60° C. and agitation at 65° C. for 1 hour. The resulting precipitate was washed with n-hexane and dried to obtain a powder of catalyst in each case.

Then, Example 12 was repeated using 20 mg of the powder and hydrogen which was charged to pressures indicated in Table 2, thereby polymerizing ethylene. The results are shown in Table 2.

EXAMPLE 21

Hafnium tetrachloride used as a hafnium compound was dissolved in n-butanol, after which an excess of n-butanol was removed by distillation under reduced pressure to obtain an n-butanol adduct of hafnium di-n-butoxydichloride, $HfCl_2(OnBu)_2 \cdot nBuOH$. This adduct was used to prepare a powder of catalyst in the same manner as in Example 12 using ethylaluminum dichloride in amounts indicated in Table 2.

Then, Example 12 was repeated except that 20 mg of the catalyst powder was used and that hydrogen was fed up to 8.7 kg/cm$^2$, thereby polymerizing ethylene. The results are shown in Table 2.

EXAMPLE 22

20 m mols of vanadyl tri-n-butoxide, 20 m mols of hafnium tetra-n-butoxide and 60 ml of benzene were mixed to obtain a homogeneous solution. Into the solution was dropped at 60° C. 480 m mols of ethylaluminum dichloride in the form of an n-hexane solution having a concentration of 4.0 mols/l, followed by adding 20 m mols of titanium tetrachloride dissolved in 20 ml of benzene. After the addition of titanium tetrachloride, the solution was agitated at 65° C. for 1 hour and the resulting precipitate was washed with n-hexane and dried to obtain a powder of catalyst. The polymerization was conducted in the same manner as in Example 12 to obtain 220 g of a polymer having an MI value of 0.15 g/10 min. and an FR value of 78. The polymerization activity was found to be K=1,900.

EXAMPLE 23

Example 12 was repeated except that in the introduction and additional charge of ethylene, butene-1 was admixed so that a molar ratio of butene-1/ethylene in the gas phase during the polymerization reaction was 0.004, thereby copolymerizing ethylene and butene-1. The results are shown in Table 2. The ethylene-butene-1 copolymer was found to contain 0.1 mole % of butene-1 units.

COMPARATIVE EXAMPLE 4

20 m mols of titanium tetra-n-butoxide and 20 m mols of vanadyl tri-n-butoxide were mixed. After the mixing, 60 ml of benzene was added to the mixture to give a homogeneous solution, after which 90 m mols of ethylaluminum dichloride was dropped into the solution at 60° C. in the form of a benzene solution of 4.0 mols/l and agitated at 65° C. for 1 hour. The resulting precipitate was washed with n-hexane and dried to obtain a powder of catalyst. Then, the polymerization was conducted in the same manner as in Example 12 except that 10 mg of the powder was used and triisobutylaluminum was used in and amount of 0.2 m mols and that a pressure of hydrogen was 2 kg/cm$^2$ and a total pressure was 5 kg/cm$^2$, thereby obtaining 250 g of a polymer. The polymer had K=5,000, MI=0.40 g/10 min. and FR=25. From the above, it is understood that a molecular weight distribution of the polymer obtained by the use of the catalytic system using no hafnium compound is narrow.

COMPARATIVE EXAMPLE 5

20 m mols of titanium tetra-n-butoxide, 20 m mols of hafnium tetra-n-butoxide and 60 ml of benzene were mixed to give a homogeneous solution. Then, 240 m mols of ethylaluminum dichloride was dropped at 60° C. in the form of a benzene solution having a concentration of 4.0 mols/l and agitated at 65° C. for 1 hour. The resulting precipitate was washed with n-hexane and dried to obtain a powder of catalyst. The catalyst powder was used to polymerize in the same manner as in Example 12 to obtain 22 g of a polymer. K was 200 and the polymer had MI=0.40 g/10 min. and FR=63. From this it is apparent that the catalyst using no vanadium compound has much lower polymerization activity.

TABLE 2

| Number | Kind and Amount (m mol) | | | Amount of Benzene (ml) | Kind and amount of organic aluminum compound (m mol) |
| --- | --- | --- | --- | --- | --- |
| | Ti Compound | V Compound | Hf Compound | | |
| Example 12 | Ti(OnBu)$_4$ 20 | VO(OnBu)$_3$ 20 | Hf(OnBu)$_4$ 20 | 90 | Al(C$_2$H$_5$)Cl$_2$ 455 |
| Example 13 | Ti(OnBu)$_4$ 20 | VO(OnBu)$_3$ 20 | Hf(OnBu)$_4$ 10 | 75 | Al(C$_2$H$_5$)Cl$_2$ 550 |
| Example 14 | Ti(OnBu)$_4$ 20 | VO(OnBu)$_3$ 20 | Hf(OnBu)$_4$ 40 | 120 | Al(C$_2$H$_5$)Cl$_2$ 510 |
| Example 15 | Ti(OnBu)$_4$ 10 | VO(OnBu)$_3$ 30 | Hf(OnBu)$_4$ 10 | 75 | Al(C$_2$H$_5$)Cl$_2$ 518 |
| Example 16 | Ti(OnBu)$_4$ 20 | VO(OnBu)$_3$ 10 | Hf(OnBu)$_4$ 20 | 75 | Al(C$_2$H$_5$)Cl$_2$ 315 |
| Example 17 | TiCl$_4$ 20 | VCl$_4$ 20 | Hf(OnBu)$_4$ 18 | 87 | Al(C$_2$H$_5$)Cl$_2$ 268 |
| Example 18 | TiCl$_4$ 20 | VCl$_4$ 20 | Hf(OnBu)$_4$ 18 | 87 | Al(C$_2$H$_5$)Cl$_2$ 59 |
| Example 19 | Ti(OnBu)$_4$ | VO(OnBu)$_3$ | HfCl$_4$ | | Al(C$_2$H$_5$)Cl$_2$ |

TABLE 2-continued

|  | | | | | |
|---|---|---|---|---|---|
| Example 20 | TiCl$_4$ 20 | VOCl$_3$ 20 | Hf(OnBu)$_4$ 18 20 | 87 90 | Al(C$_2$H$_5$)$_{1.5}$Cl$_{1.5}$ 468 513 |
| Example 21 | Ti(OnBu)$_4$ 20 | VO(OnBu)$_3$ 20 | Hf(OnBu)$_2$Cl$_2$ .nBuOH 20 | 90 | Al(C$_2$H$_5$)Cl$_2$ 565 |
| Example 22 | TiCl$_4$ 20 | VO(OnBu)$_3$ 20 | Hf(OnBu)$_4$ 20 | 90 | Al(C$_2$H$_5$)Cl$_2$ 480 |
| Example 23 | Ti(OnBu)$_4$ 20 | VO(OnBu)$_3$ 20 | Hf(OnBu)$_4$ 20 | 90 | Al(C$_2$H$_5$)Cl$_2$ 455 |
| Comparative Example 4 | Ti(OnBu)$_4$ 20 | VO(OnBu)$_3$ 20 | 0 | 60 | Al(C$_2$H$_5$)Cl$_2$ 90 |
| Comparative Example 5 | Ti(OnBu)$_4$ 20 | 0 | Hf(OnBu)$_4$ 20 | 60 | Al(C$_2$H$_5$)Cl$_2$ 240 |

| Number | Hf/Ti | $\frac{Ti + Hf}{V}$ | u/t | Pressure of hydrogen (kg/cm$^2$) | Yield of polymer (g) | K | MI (g/10 min.) | FR |
|---|---|---|---|---|---|---|---|---|
| Example 12 | 1.0 | 2.0 | 3.5 | 9.0 | 231 | 2,100 | 0.10 | 95 |
| Example 13 | 0.5 | 1.5 | 5.0 | 8.7 | 325 | 2,800 | 0.30 | 70 |
| Example 14 | 2.0 | 3.0 | 3.0 | 9.7 | 134 | 1,400 | 0.05 | 75 |
| Example 15 | 1.0 | 0.67 | 4.5 | 8.7 | 162 | 1,400 | 0.15 | 71 |
| Example 16 | 1.0 | 4.0 | 3.0 | 8.5 | 156 | 1,300 | 0.10 | 70 |
| Example 17 | 0.9 | 1.9 | 3.0 | 8.7 | 244 | 2,100 | 0.17 | 90 |
| Example 18 | 0.9 | 1.9 | 1.2 | 8.0 | 208 | 1,600 | 0.25 | 60 |
| Example 19 | 0.9 | 1.9 | 4.0 | 8.9 | 258 | 2,300 | 0.09 | 93 |
| Example 20 | 1.0 | 2.0 | 3.5 | 8.5 | 240 | 2,000 | 0.15 | 75 |
| Example 21 | 1.0 | 2.0 | 4.5 | 8.7 | 232 | 2,000 | 0.06 | 90 |
| Example 22 | 1.0 | 2.0 | 4.0 | 8.7 | 220 | 1,900 | 0.15 | 70 |
| Example 23 | 1.0 | 2.0 | 3.5 | 9.0 | 236 | 2,150 | 0.13 | 96 |
| Comparative Example 4 | 0 | 1.0 | 1.0 | 2.0 | 250 | 5,000 | 0.40 | 25 |
| Comparative Example 5 | 1.0 | ∞ | 3.0 | 9.0 | 22 | 200 | 0.40 | 63 |

EXAMPLE 24

(1) Preparation of Solid Catalytic Components

Into a 300 ml four necked flask were charged 20 m mols of titanium tetra-n-butoxide and 20 m mols of vanadyl tri-n-butoxide, to which 19 m mols of hafnium tetrachloride was gradually added under ice-cooled conditions. After the addition, the mixture was agitated at 50° C. for 1 hour to obtain a homogeneous liquid. To the liquid was added 33 ml of benzene to give a solution. The solution was heated to 60° C., to which was added 277 m mols of ethylaluminum dibromide in the form of a 55 vol. % benzene solution, followed by agitation at 65° C. for 1 hour. The resulting precipitate was washed with n-hexane and dried to obtain a powder of catalyst.

(2) Polymerization of Ethylene 1,000 cc of n-hexane was placed in a 2 l autoclave, into which 20 mg of the above catalyst powder was charged.

The system was heated to 90° C., into which hydrogen was charged to 6.5 kg/cm$^2$, followed by further charging 0.08 m mols of triisobutylaluminum together with ethylene so that a total pressure was 15 kg/cm$^2$. The ethylene was observed to be absorbed simultaneously with the charge of ethylene and fresh ethylene was additionally charged so that the total pressure was held at 15 kg/cm$^2$.

One hour after the charge, ethanol was fed under pressure to stop the polymerization.

As a result, 325 g of a polymer having MI=0.080 g/10 min. and FR=100 was obtained. The polymerization activity K was found to be K=2110.

EXAMPLES 25–28

Titanium tetra-n-butoxide, vanadyl tri-n-butoxide and hafnium tetra-n-butoxide were mixed in amounts indicated in Table 3.

Benzene was then added to the mixture in an amount indicated in Table 3, to which was further added at 60° C. ethylaluminum dibromide in the form of a 55 vol. % benzene solution, followed by agitation at 65° C. for 1 hour.

The resulting precipitate was washed with n-hexane and dried to obtain a powder of catalyst.

20 mg of this powder was used to polymerize ethylene in the same manner as in Example 24 except that hydrogen was charged to pressures indicated in Table 3. The results are shown in Table 3.

EXAMPLES 29–31

Various titanium, vanadium and hafnium compounds were mixed in such ratios as indicated in Table 3.

In all the examples, particularly Examples 30 and 31, heat generation and color change took place on the mixing, revealing that interactions between the compounds occurred.

After the mixing, each mixture was agitated at 50° C. for 1 hour, to which benzene was added in an amount indicated in Table 3. Thereafter, ethylaluminum dibromide was dropped in amounts indicated in Table 3 at 60° C. in the form of a 55 vol. % benzene solution into the mixture, and agitated at 65° C. for 1 hour.

The resulting precipitate was washed with n-hexane and dried to obtain a powder of catalyst.

20 mg of each powder was used to polymerize ethylene in the same manner as in Example 24 except that hydrogen was introduced to pressures indicated in Table 3. The results are shown in Table 3.

EXAMPLE 32

Example 25 was repeated to prepare a solid catalytic component except that 400 m mols of ethylaluminum sesquibromide was used instead of 531 m mols of ethylaluminum dibromide.

20 mg of the thus prepared solid catalytic component was used to polymerize ethylene in the same manner as in Example 24 except that hydrogen was charged to a pressure indicated in Table 3. The results are shown in Table 3.

EXAMPLE 33

Example 24 was repeated except that butene-1 was admixed with ethylene so that a molar ratio of butene-1/ethylene in a gas phase during the polymerization reaction was 0.004, thereby copolymerizing ethylene and butene-1.

The results are shown in Table 3, and the obtained polymer was an ethylene-butene-1 copolymer containing 0.1 mol % of butene-1 units.

and dried to a powder of catalyst. The powder had a Hf/Ti of 2.0, a (Ti+Hf)/V of 3.0 and an u/t of 0.71.

Then, Example 12 was repeated for polymerizing ethylene except that a pressure of hydrogen was 8 kg/cm$^2$ thereby obtaining 156 g of a polymer having a MI of 0.41 g/10 min. and a FR of 60. The polymerization activity K was 1,200.

EXAMPLE 35

A solid catalytic component was prepared and the polymerization was conducted in the same manner as in Example 24 using a mixture of 180 m mols of ethylaluminum dibromide and 97 m mols of ethylaluminum dichloride instead of 277 m mols of ethylaluminum dibromide. As a result, 340 g of polyethylene having a MI valve of 0.070 g/10 min. and a FR valve of 95 was obtained. The polymerization activity K was 2210.

EXAMPLE 36

(1) Preparation of Solid Catalytic Component

In a 300 ml four necked flask were mixed 20 m mols

TABLE 3

| Number | Titanium Compound (m mol) | Vanadium Compound (m mol) | Hafnium Compound (m mol) | Benzene (ml) | Aluminum Bromide Compound (m mol) |
|---|---|---|---|---|---|
| Example 24 | Ti(OnBu)$_4$ 20 | VO(OnBu)$_3$ 20 | HfCl$_4$ 19 | 33 | C$_2$H$_5$AlBr$_2$ 277 |
| Example 25 | Ti(OnBu)$_4$ 20 | VO(OnBu)$_3$ 20 | Hf(OnBu)$_4$ 24 | 36 | C$_2$H$_5$AlBr$_2$ 531 |
| Example 26 | Ti(OnBu)$_4$ 20 | VO(OnBu)$_3$ 20 | Hf(OnBu)$_4$ 24 | 36 | C$_2$H$_5$AlBr$_2$ 413 |
| Example 27 | Ti(OnBu)$_4$ 20 | VO(OnBu)$_3$ 20 | Hf(OnBu)$_4$ 24 | 36 | C$_2$H$_5$AlBr$_2$ 166 |
| Example 28 | Ti(OnBu)$_4$ 20 | VO(OnBu)$_3$ 20 | Hf(OnBu)$_4$ 16 | 31 | C$_2$H$_5$AlBr$_2$ 459 |
| Example 29 | Ti(OnBu)$_4$ 20 | VO(OnBu)$_3$ 20 | HfCl$_2$(OnBu)$_2$.nBuOH 20 | 33 | C$_2$H$_5$AlBr$_2$ 430 |
| Example 30 | TiBr$_4$ 20 | VO(OnBu)$_3$ 20 | Hf(OnBu)$_4$ 20 | 33 | C$_2$H$_5$AlBr$_2$ 275 |
| Example 31 | Ti(OnBu)$_4$ 20 | VO(OnBu)$_3$ 20 | HfBr$_4$ 24 | 36 | C$_2$H$_5$AlBr$_2$ 267 |
| Example 32 | Ti(OnBu)$_4$ 20 | VO(OnBu)$_3$ 20 | Hf(OnBu)$_4$ 24 | 36 | (C$_2$H$_5$)$_3$Al$_2$Br$_3$ 400 |
| Example 33 | Ti(OnBu)$_4$ 20 | VO(OnBu)$_3$ 20 | HfCl$_4$ 19 | 33 | C$_2$H$_5$AlBr$_2$ 277 |

| Number | Hf/Ti | $\frac{Ti + Hf}{V}$ | u/t | Pressure of hydrogen (kg/cm$^2$) | Yield of polymer (g) | K | MI (g/10 min.) | FR |
|---|---|---|---|---|---|---|---|---|
| Example 24 | 0.95 | 1.95 | 2.46 | 6.5 | 325 | 2,110 | 0.080 | 110 |
| Example 25 | 1.2 | 2.2 | 3.85 | 7.1 | 265 | 1,870 | 0.035 | 99 |
| Example 26 | 1.2 | 2.2 | 3.0 | 7.1 | 285 | 2,010 | 0.07 | 101 |
| Example 27 | 1.2 | 2.2 | 1.2 | 6.0 | 213 | 1,300 | 0.62 | 61 |
| Example 28 | 0.8 | 1.80 | 3.76 | 4.9 | 391 | 2,100 | 0.080 | 75 |
| Example 29 | 1.0 | 2.0 | 3.46 | 7.1 | 278 | 1,960 | 0.13 | 108 |
| Example 30 | 1.0 | 2.0 | 2.42 | 6.5 | 290 | 1,880 | 0.060 | 96 |
| Example 31 | 1.2 | 2.2 | 2.28 | 7.1 | 277 | 1,950 | 0.11 | 100 |
| Example 32 | 1.2 | 2.2 | 2.17 | 6.8 | 237 | 1,600 | 0.68 | 70 |
| Example 33 | 0.95 | 1.95 | 2.46 | 6.7 | 318 | 2,120 | 0.12 | 109 |

EXAMPLE 34

20 m mols of titanium trichloro-n-butoxide, 20 m mols of vanadyl monochlorodi-n-butoxide, 40 m mols of hafnium tetrachloride and 120 ml of benzene were mixed to give a homogeneous solution, into which 100 m mols of triethylaluminum was dropped at 60° C. in the form of a benzene solution having a concentration of 4.0 mols/l, followed by agitation at 65° C. for 1 hour. The resulting precipitate was washed with n-hexane of titanium tetra-n-butoxide and 20 m mols of vanadium tri-n-butoxide, followed by gradually adding 6 m mols of zirconium tetrachloride and then 14 m mols of hafnium tetrachloride. After the addition, the mixture was agitated at 50° C. for 2 hours to obtain a homogeneous liquid. To the liquid was added 33 ml of benzene to give a benzene solution. The solution was heated to 40° C. and was incorporated with 286 m mols of ethylaluminum dibromide in the form of a 55 vol. % benzene solution, which was agitated at 65° C. for 1 hour. It was found that x/r=4.65, (Zr+Hf)/Ti=1 and (Ti+Zr+Hf)/V=2. The resulting precipitate was washed with n-hexane and was used for subsequent polymerization in the form of a n-hexane sluryy.

(2) Polymerization 10 l of n-hexane was placed in a 20 l autoclave, into which 120 mg of the above solid catalytic component was charged. After heating the content to 90° C., hydrogen was introduced into the autoclave to 5.8 kg/cm$^2$ and then 0.48 m mols of triethylaluminum and 90 g of butene-1 together with ethylene were fed so that a total pressure was 15 kg/cm$^2$. On the introduction of ethylene, absorption of ethylene was observed and fresh ethylene was additionally introduced so that a total pressure was held at 15 kg/cm$^2$. Two hours after the introduction, ethanol was charged under pressure to stop the polymerization. The average molar ratio of butene-1 to ethylene in the gas phase was 1.8 mol %. An ethylene-butene-1 copolymer was obtained in an amount of 3,600 g and its polymerization activity K was 1,790. The copolymer had a MI of 0.07 g/10 min. a FR of 80 and $\rho$ of 0.956 g/cc. An amount of extrusion molding as a measure for extrusion moldability was 17 g/rpm.hr. when determined by measuring an amount of extrusion by the use of the single-screw extruder Model 21D made by Brabender Co., Ltd. (with a full-flighted screw having an aperture of 19.1 mm, L/D of 21 and a compression ratio of 3 and a disc die having a diameter of 20 mm and a clearance of 0.5 mm) at a die temperature of 200° C. at 150 r.p.m. and dividing the amount of extrusion by the number of revolutions (150 r.p.m.).

Then, an extrude Modern EA 40 (made by Modern Machinery Co., Ltd., and "Modern" is a registered trade name) and a die having a radius of 50 mm and a clearance of 1.2 mm were used to make a 25$\mu$ thick film under the following molding conditions: C1: 160° C., C2: 180° C., C3: 200° C., H: 200° C. and D: 200° C., and BUR: 3. An abnormal flow phenomenon of a melt polymer was not recognized at all by visual observation and the resulting molding showed no chapping on the surface thereof.

EXAMPLE 37

(1) Preparation of Solid Catalytic Component

Example 36 was repeated using 18 m mols of the hafnium compound, 10 m mols of the zirconium compound and 259 m mols of ethylaluminum dibromide thereby obtaining a solid catalytic component. The thus obtained component had x/r=4.5, (Zr+Hf)/Ti=1.4 and (Ti+Zr+Hf)/V=2.4.

(2) Polymerization

The polymerization was conducted in the same manner as in Example 36 except that the feed of hydrogen was 7.7 kg/cm$^2$ and the amount of butene was 80 g. The average molar ratio of butene-1 to ethylene in the gas phase was 1.9 mol %. As a result, 2,500 g of ethylene-butene-1 copolymer was obtained and its polymerization activity K was 1,600. The copolymer had a MI value of 0.05 g/10 min., a FR value of 95 and a density of 0.955 g/cc. The results of test for extrusion moldability were excellent and an amount of extrusion molding was found to be 16.5 g/rpm.hr. No abnormal flow phenomenon of a melt polymer was observed. It is noted that the extrusion moldability and the presence or absence of abnormal flow phenomenon were determined in the same manner as in Example 36. This is also applied to whenever such determinations appear hereinlater.

EXAMPLE 38

(1) Preparation of Solid Catalytic Component

Example 36 was repeated using 10 m mols of the zirconium compound, 10 m mols of the hafnium compound and 296 m mols of ethylaluminum dibromide thereby preparing a solid catalytic component. It was found that x/r=4.8, (Zr+Hf)/Ti=1.0 and (Ti+Zr+Hf)/V=2.0.

(2) Polymerization

Example 36 was repeated except that a feed of hydrogen was 4.7 kg/cm$^2$ and an amount of butene-1 was 100 g. The average molar ratio of butene-1 to ethylene in the gas phase was 1.6 mol %. An ethylene-butene-1 copolymer was obtained in an amount of 4,200 g and its polymerization activity K was 1,840. The polymer had a MI value of 0.08 g/10 min., a FR value of 70 and a density of 0.955 g/cc. As a result of the test for extrusion molding, it was found that an amount of extrusion molding was 16 g/rpm.hr. and that no abnormal flow phenomenon was observed at all.

EXAMPLE 39

(1) Preparation of Solid Catalytic Component

In a 300 m four necked flask were mixed 20 m mols, as titanium, of titanium tetra-n-butoxide dimer, Ti$_2$O(OnC$_4$H$_9$)$_6$, and 20 m mols of vanadium tri-n-butoxide, followed by gradually adding 6 m mols of zirconium tetrachloride and then 14 m mols of hafnium tetrachloride. After the addition, the mixture was agitated at 50° C. for 2 hours to obtain a homogeneous liquid. To the liquid was added 33 ml of benzene to give a benzene solution, which was then heated to 40° C. and incorporated with 230 m mols of ethylaluminum dibromide in the form of a 55 vol. % benzene solution, followed by agitating at 65° C. for 1 hour. It was found that x/r=4.5, (Zr+Hf)/Ti=1 and (Ti+Zr+Hf)/V=2. The resulting precipitate was washed with n-hexane and served for polymerization in the form of a n-hexane slurry.

(2) Polymerization 10 l of n-hexane was placed in a 20 l autoclave, into which 120 mg of the solid catalytic component was charged. After heating to 90° C., hydrogen was fed into the autoclave up to 5.7 kg/cm$^2$, followed by introducing 0.48 m mols of triethylal-uminum and 90 g of butene-1 together with ethylene so that a total pressure was 15 kg/cm$^2$. Absorption of ethylene was observed on the introduction of ethylene and fresh ethylene was additionally introduced so that a total pressure was held at 15 kg/cm$^2$. Two hours after the introduction, ethanol was charged under pressure to stop the polymerization. The average molar ratio of butene-1 to ethylene in the gas phase was 1.8 mol %. As a result, 3,700 g of ethylene-butene-1 copolymer was obtained and its polymerization activity K was 1,810. It was found that a MI value was 0.06 g/10 min., a FR value was 77, and $\rho$=0.957 g/cc. When a test was conducted to evaluate an extrusion moldability, it was found that an amount of extrusion molding was 16 g/rpm.hr. Any abnormal flow phenomenon of a melt polymer was not observed visually and an obtained molding showed no chapping on the surface thereof.

EXAMPLE 40

(1) Preparation of Solid Catalytic Component

Example 39 was repeated using titanium tetraisopropoxide tetramer (Ti$_4$O$_3$(O-i-C$_3$H$_7$)$_{10}$) as a titanium compound, thereby preparing a solid catalytic component. It was found that x/r=4.9, (Zr+Hf)/Ti=1.4 and (Ti+Zr+Hf)/V=2.4.

(2) Polymerization

Example 39 was repeated except that a feed of hydrogen was 5.9 kg/cm$^2$ and an amount of butene-1 was 85 g. The average molar ratio of butene-1 to ethylene in the gas phase was 1.9 mol %. As a result, 3,300 g of ethylene-butene-1 copolymer was obtained and its polymerization activity K was 1,660. It was also found that a MI value was 0.05 g/10 min., a FR value was 70 and ρ=0.956 g/cc. As a result of the test for extrusion moldability, an amount of extrusion molding was found to be 15.5 g/rpm.hr, and no abnormal flow phenomenon of a melt polymer was recognized.

EXAMPLE 41

(1) Preparation of Solid Catalytic Component

Example 39 was repeated using 10 m mols of the zirconium compound, 10 m mols of the hafnium compound and 240 m mols of ethylaluminum dibromide thereby preparing a solid catalytic component. It was found that x/r=4.7, (Zr+Hf)/Ti=1.0, and (Ti+Zr+Hf)/V=2.0.

(2) Polymerization

Example 39 was repeated except that a feed of hydrogen was 4.9 kg/cm$^2$ and an amount of butene-1 was 100 g. The average molar ratio of butene-1 to ethylene in the gas phase was 1.6 mol %. As a result, 4,100 g of ethylene-butene-1 copolymer was obtained and its polymerization activity was 1,840. The polymer was found to have a MI value of 0.07 g/10 min., a FR value of 69 and a density of 0.955 g/cc. As a result of the test for extrusion moldability, an amount of extrusion molding was found to be 15 g/rpm.hr. and no abnormal flow phenomenon was recognized.

Industrial Utility

As was seen from the foregoing, the process of the invention has particular utility in the production of polyolefins, particularly polyethylene, for extrusion or blow molding.

What is claimed is:

1. A process for producing olefin polymers having a wide and controllable molecular weight distribution, comprising: polymerizing an olefin in the presence of a catalyst which comprises (A) a solid catalytic component separated from the reaction mixture obtained by reacting (a) an organoaluminum compound with a liquid material obtained by mixing (b) a vanadium compound selected from the group consisting of vanadium halides and oxygen-containing organovanadium compounds, (c) a hafnium compound selected from the group consisting of hafnium halides and oxygen-containing organohafnium compounds, and (d) a titanium compound selected from the group consisting of titanium halides and oxygen-containing organotitanium compounds in the presence or absence of a diluent, the relative amounts of said vanadium, hafnium and titanium in said solid catalyst component meeting the relationships: 0.1<Hf/Ti<10, 0.1<(Hf+Ti)/V<100 and (B) an organoaluminum compound.

2. The process of claim 1, wherein said solid catalytic component is obtained by interacting the titanium compound, vanadium compound, hafnium compound and organoaluminum compound in amounts sufficient to satisfy the following inequality:

$$u/t > 0.6$$

wherein u represents the sum total on a gram equivalent basis of the halogen atoms present in the titanium compound, the vanadium compound, the hafnium compound and the organoaluminum compound, and t represents the sum total on a gram equivalent basis of the metal atoms present in the titanium compound, the vanadium compound and the hafnium compound.

3. The process of claim 1, wherein said solid catalytic component is obtained by interacting the titanium compound, the vanadium compound, the hafnium compound and the organoaluminum compound in amounts sufficient to satisfy the following inequalities:

$$0.2 < Hf/Ti < 8 \text{ and } 0.05 < (Hf+Ti)/V < 10$$

wherein Ti, Hf and V represent the amounts on a gram atom basis of titanium, hafnium and vanadium atoms present in the respective compounds.

4. The process of claim 1, wherein said organoaluminum compound used for preparing the solid catalytic component is a organoaluminum bromide.

5. A process for producing olefin polymers having a wide and controllable molecular weight distribution, comprising: polymerizing an olefin in the presence of a catalyst which is comprised of (A) a solid catalytic component obtained by interacting (a) a vanadium compound selected from the group consisting of vanadium halides and oxygen-containing organovanadium compounds, (b) a hafnium compound selected from the group consisting of hafnium halides and oxygen-containing organohafnium compounds, (c) a tetravalent titanium alcoholate having at least one Ti-O-Ti bond per molecule thereof and represented by the formula $$[TiO_{q^1}(OR^{12})_{q^2}]_{q^3}$$

wherein q$^1$ and q$^2$ are, respectively, values of 0.5≦q$^1$≦1 and 2<q$^2$≦3 provided that q$^1$×2+q$^2$=4, q$^3$ is an integer of 2≦q$^3$≦6, and R$^{12}$ represents a hydrocarbon group containing 1-20 carbon atoms, (d) an organoaluminum compound, and (e) a zirconium compound selected from the group consisting of zirconium halides and oxygen-containing organozirconium compounds, and (B) an organoaluminum compound component.

6. The process of claim 5, wherein the amount of the zirconium compound is in the range of 0.1-10 as expressed by the atomic ratio of zirconium to hafnium in the hafnium compound (Zr/Hf).

7. The process of claim 1, 2, 3, 4, 5 or 6, wherein said vanadium compound is a compound represented by the formula:

$$VO(OR^2)_{a2}X^2_{3-a2} \text{ or } V(OR^2)_{b2}X^2_{4-b2}$$

wherein R$^2$ represents a hydrocarbon group containing 1-12 carbon atoms, X$^2$ represents a halogen atom, a$^2$ is a value of 0≦a$^2$≦3, and b$^2$ a value of 0≦b$^2$≦4, and said hafnium compound is a compound represented by the formula:

$$Hf(OR^3)_{a4}X^3_{4-a4}$$

wherein $R^3$ represents a hydrocarbon group containing 1–12 carbon atoms, $X^3$ represents a halogen atom, and $a^4$ is a value of $0 \leq a^4 \leq 4$.

8. The process of claim 1, wherein said diluent is a $C_6$–$C_{20}$ alkane, a $C_6$–$C_{20}$ cycloalkane, a $C_6$–$C_{20}$ aromatic hydrocarbon, a halogenated hydrocarbon, a $C_1$–$C_8$ alcohol, a carboxylic acid ester, an ether or a pyridine compound.

9. The process of claim 1 wherein said olefin is ethylene or a mixture of ethylene with up to 10 wt. % of another α-olefin.

* * * * *